G. L. MILLER.
CORN HUSKER.
APPLICATION FILED DEC. 11, 1913.
Reissued Aug. 11, 1914.
13,787.
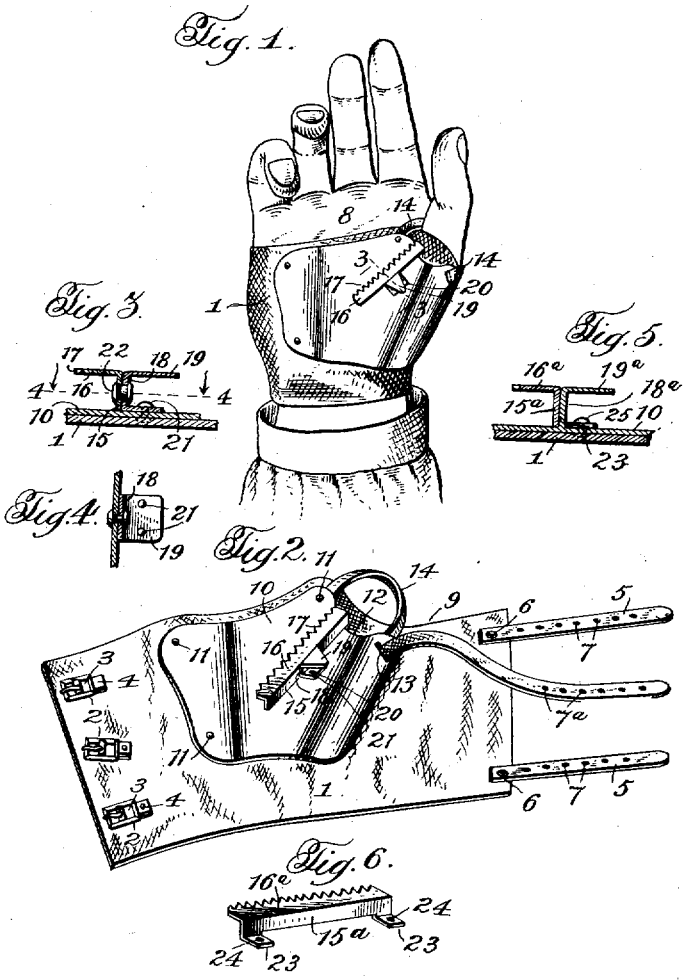
Witnesses.
Jas. E. Hutchinson.
H. N. Ramsey
Inventor:
By Gustave L. Miller,
Bacon & Milans, Attorneys.

UNITED STATES PATENT OFFICE.

GUSTAVE L. MILLER, OF GENESEO, ILLINOIS, ASSIGNOR TO THE BOSS MANUFACTURING COMPANY, OF KEWANEE, ILLINOIS, A CORPORATION OF ILLINOIS.

CORN-HUSKER.

13,787. Specification of Reissued Letters Patent. Reissued Aug. 11, 1914.

Original No. 1,068,261, dated July 22, 1913, Serial No. 760,937. Application for reissue filed December 11, 1913. Serial No. 806,130.

*To all whom it may concern:*

Be it known that I, GUSTAVE L. MILLER, a citizen of the United States of America, residing at Geneseo, in the county of Henry and State of Illinois, have invented a new and useful Improvement in Corn-Huskers, of which the following is a specification.

My invention is an improvement in corn huskers, and has for its object to provide a hand device of the character specified which may be easily attached to and detached from the hand of the user, and by means of which the husk may be readily torn from the ear, without injury to the hand or strain thereon.

In the drawings: Figure 1 is a perspective view of the husker in place, Fig. 2 is a similar view with the husker detached, Fig. 3 is a section on the line 3—3 of Fig. 1, Fig. 4 is a section on the line 4—4 of Fig. 3, Fig. 5 is a view similar to Fig. 3 of a modified construction, and Fig. 6 is a perspective view of the angle plate shown in Fig. 5.

In the illustrated embodiment of the invention I provide a support 1, preferably composed of leather or like flexible material, the said support being in the shape of a strip or band having at one end a series of buckles 2, the said buckles being secured to the support in the present instance by means of strips 3 of leather, the said strips being riveted at 4 to the support. Three buckles are provided in the present instance, and at the opposite end of the strip, straps 5 are arranged, the said straps being secured to the support at one end by a rivet 6 or the like, and each strap is provided with a longitudinal series of openings 7 for engagement by the adjacent buckle at the opposite end. The straps 5 are adjacent to the side edges of the support, and the said straps are adapted to engage the lateral buckles. One edge of the said support, namely, the lower, is straight, and the opposite edge is shaped to fit the palm and thumb of the hand 8, the buckles and the straps being at the back of the hand, when the device is in place. At the end adjacent to the straps 5 the upper edge of the support is cut away as indicated at 9 to fit around the thumb, and a metal plate 10 is secured to the outer face of the support by means of rivets 11 or the like. The said plate is approximately rectangular in shape, and is longitudinally curved to fit the concavity of the palm of the hand and the convexity of the base of the thumb. The plate is also curved to fit the convexity of the heel of the hand, and the extension at the base of the thumb is of considerable breadth as shown in order that it may support the strain thereon during the removal of the husk. That is, the said plate is formed on a double curve, longitudinally, the concave portion being adjacent to the buckles and the convex portion adjacent to the straps. The said support is also cut away at the corner adjacent to the thumb as indicated at 12 to fit the base of the thumb, and at the lower corner of the said cut away portion the plate is provided with a slot or opening 13.

The rivet 11 that connects the upper corner of the plate to the support also connects one end of a strap 14 to the said support and to the plate, the end of the strap being arranged between the plate and the support as shown. The strap intermediate its ends is passed through the slot 13 as shown in Figs. 1 and 2, and the free end of the strap is provided with a longitudinal series of openings $7^a$, the said end being adapted to engage the central buckle at the opposite end.

An angle plate is connected with the plate 10, in any suitable manner, the said plate comprising two portions 15 and 16, arranged at substantially a right angle with respect to each other, and the free edge of the portion 16 is serrated as indicated at 17. The angle plate is arranged with the portion 15 approximately perpendicular to the outer face of the plate 10, and a second plate is secured to the said plate 10 at approximately the center of the angle plate. The angle plate 15—16 is arranged diagonally of the plate, and of the support 1, the direction of length of the said plate being approximately parallel with the direction of length of the thumb when the said thumb is extended. The second plate is approximately U shaped, comprising a body 18 and arms 19 and 20, the latter arm resting against the outer face of the plate 10 and being secured thereto in any suitable manner as for instance, by means of rivets 21. The body 18 of the said plate lies against that face of the portion 15 of the angle plate remote from the teeth 17, and a rivet 22 is passed through registering openings in the body 18 and the portion 15 to secure the two plates to the plate 10. The arm 19 of the plate 18—19—20 is pointed to form a tooth as shown more particularly in Figs. 1 and 2, and the said portion 19 extends in the opposite direction to the teeth 17.

The angle plate and the plate bearing the single tooth may be connected to the plate 10 as shown in Figs. 5 and 6, wherein the tooth 19ª corresponding to the tooth 19 is integral with the plate 10, being arranged parallel with the said plate 10 in spaced relation and connected thereto by a web 18ª. The angle plate 15ª—16ª corresponding to the angle plate 15—16, before mentioned, is arranged in the same manner as the said angle plate 15—16, but is connected to the plate 10 by means of lugs 23, the said lugs being at the ends of the portion 15ª, and each being perforated as shown at 24, to receive a rivet 25 or the like, whereby to connect the said lug to the plate 10.

In the use of the device, it is secured to the hand as shown in Fig. 1, the plate 10 being arranged in the palm of the hand and the straps are engaged with the lateral buckles 2 at the back of the hand. That portion of the strap 14 between the slot 13 and the rivet 11 is looped over the thumb as shown, and the free end of the strap is engaged with the central buckle 2.

The corn is husked by first grasping the husk while the ear is yet attached to the stalk with the left hand, then moving the right hand toward the body of the user to engage that part of the husk remaining on the ear with the hook 19, at the same time grasping the bared ear with the thumb and fingers of the right hand, then breaking the ear from the stalk. The serrated edge of the angle plate is engaged with the ear to hold the same firmly in hand, thus permitting the ear to be held without the use of the thumb, and thereby decreasing the strain upon the hand and the thumb in the operation. The single tooth or hook 19 is used alone to tear the husks apart.

The teeth 17 are especially adapted to grip and hold the ear during the breaking of the ear from the stalk, and in fact throughout the entire time that the ear is held in the hand. It will be noted from an inspection of Figs. 3 and 4 that the rivet 22 is approximately rectangular in cross section, and the openings through which the rivet extends are of greater length than width, the length of the openings being perpendicular to the plate 10, and the angle plate is preferably so positioned and connected to cause the serrated edge to readily engage the ear throughout the entire series of serrations.

It will be understood that the plate 10 is shaped to fit the hand, and the said plate and the support 1 protect the base of the hand and the wrist in somewhat the manner of a glove. The loop of the strap 14 holds the upper part of the support and also the plate 10, firmly to the thumb.

I claim:

1. A corn husker, comprising a support of flexible material, a plate of rigid material secured to the outer face of the support intermediate the ends thereof and near the upper edge of the said support, said plate being curved longitudinally to fit the palm of the hand and the base of the thumb and having a notch or recess at the base of the thumb for fitting the said base, said support having means for securing the same to the hand of the wearer, an angle plate consisting of two portions at approximately a right angle to each other connected loosely with the plate, said angle plate having one of its portions approximately perpendicular to the face of the plate and having the free edge of the other portion serrated and a single tooth connected to the plate at approximately the center of the angle plate and extending in the opposite direction to the serrated edge.

2. A corn husker, comprising a support of flexible material adapted to inclose that portion of the hand adjacent to the wrist, a plate of rigid material secured to the outer face of the support intermediate the ends thereof, means in connection with the support for securing the same to the hand of the wearer, and means on the plate for grasping the husk and ear, said means comprising a plate having its free edge serrated and having a tooth at approximately the center and extending in the opposite direction from the serrations, and means for securing the said plate to the first-named plate in approximately parallel and spaced relation and with the length thereof extending approximately parallel with the length of the thumb of the user, said plate being capable of limited movement with respect to the first-named plate.

3. In a corn husker, a plate of rigid material shaped to fit the palm of the hand and the base of the thumb, means for connecting the said plate to the hand of the user, said plate having a rounded recess at the corner adjacent to the base of the thumb for fitting the said base of the thumb, and a grasping plate connected with the first named plate in spaced relation, said grasping plate having its length diagonal to the first-named plate and having its inner edge serrated and its opposite edge provided with a hook.

4. In a corn husker, a rigid plate, a flexible support for connecting the plate to the hand of the wearer, and a grasping plate connected with the first-named plate in spaced relation and having one edge serrated and having the opposite edge provided with a hook.

5. In a corn husker, a plate, means for connecting the plate to the hand of the user, and a grasping plate offset laterally from the face of the first-named plate, said grasping plate having a series of teeth at one side thereof and a hook at the other side.

6. In a corn husker, a palm plate, means for connecting the plate to the hand of the user, and an elongated grasping plate offset laterally from the face of the first mentioned plate, said grasping plate having at the free edge of the offset part thereof a series of teeth, the palm plate projecting forwardly beyond said free edge and the space between the palm plate and the inner surface of the offset part of the grasping plate being unobstructed.

7. In a corn husker, a palm plate, means for connecting the palm plate to the hand of the user, said palm plate having on its face an elongated grasping member projecting diagonally across the plate with an edge spaced from the face of the palm plate and said spaced edge having a series of teeth, and a supporting part for the grasping plate extending in a direction opposite to that of the teeth and secured to the palm plate.

8. In a corn husker, a palm plate, means for connecting the plate to the hand of the user, a grasping plate offset laterally from the face of the first named plate and spaced from the edges of the same, said grasping plate having a series of teeth at one side thereof, and a hook on the palm plate adjacent said grasping plate, extending in an opposite direction intermediate the ends of the grasping plate.

9. In a corn husker, a rigid plate, supporting means for connecting the plate to the hand of the user, a grasping plate connected with the first named plate in spaced relation and having one edge serrated, and a hook disposed in a direction opposite to the serrated edge of said grasping plate, and means for securing said hook to the palm plate adjacent to the grasping plate.

10. In a corn husker, a rigid plate, supporting means for connecting the plate to the hand of the user, a grasping plate connected with the first named plate in spaced relation and having one edge serrated, and a hook adjacent said grasping plate having an offset foot connected to the palm plate, and means engaging said offset foot for connecting the grasping plate to the palm plate.

11. In a corn husker, the combination of a palm plate, means for connecting the plate to the hand of the user, a grasping plate positioned on the palm plate and extending at an angle to the forward edge thereof, said grasping plate being substantially L-shaped in cross section, thereby providing an upright wall and a forwardly extending wall having in its free edge a series of teeth, and a hook extending in a direction opposite to the teeth of the grasping plate and arranged intermediate the ends of the latter.

In testimony whereof I have hereunto set my hand in the presence of two subscribing witnesses.

GUSTAVE L. MILLER.

Witnesses:
T. R. Stokes,
W. H. Green.

Copies of this patent may be obtained for five cents each, by addressing the "Commissioner of Patents, Washington, D. C."